United States Patent [19]

Wallisch et al.

[11] Patent Number: 5,113,955
[45] Date of Patent: May 19, 1992

[54] PRICE-CALCULATING ELECTRONIC SCALE

[75] Inventors: Gebhard Wallisch, Burladingen; Dieter Eismann, MeStetten; Roland Matthes, Bitz; Manfred Kammerer, Strasse, all of Fed. Rep. of Germany

[73] Assignee: Mettler-Toledo (Albstadt) GmbH, Albstadt, Fed. Rep. of Germany

[21] Appl. No.: 521,561

[22] Filed: May 10, 1990

[30] Foreign Application Priority Data

May 12, 1989 [DE] Fed. Rep. of Germany ....... 3915645

[51] Int. Cl.⁵ .................... G01G 19/40; G06K 15/00; H03K 17/94; G06F 3/00
[52] U.S. Cl. ................................ 177/25.15; 235/378; 341/22; 364/709.12; 364/405
[58] Field of Search ..................... 177/25.15; 235/378; 341/22; 364/405, 709.12; 340/711

[56] References Cited

U.S. PATENT DOCUMENTS

| | | | |
|---|---|---|---|
| 4,693,329 | 9/1987 | Hikita | 177/25.15 X |
| 4,893,236 | 1/1990 | Ohnishi et al. | 364/405 |
| 4,901,237 | 2/1990 | Hikita et al. | 177/25.15 X |
| 4,959,831 | 9/1990 | Wroblewski | 340/711 X |

*Primary Examiner*—Georege H. Miller, Jr.
*Attorney, Agent, or Firm*—Fleit, Jacobson, Cohn, Price, Holman & Stern

[57] ABSTRACT

A price-calculating scale for self-service use equipped with an input keyboard with key fields provided with pictographs of goods, the price per kilogram of which is entered in the scales by means of the appropriate key field. For the purpose of adaptation to the current type of goods to be priced, an exchangeable key pads having a varied arrangement of the key fields is provided. The scale is programmable to automatically adapt to each key pad.

24 Claims, 6 Drawing Sheets

PRICE-CALCULATING ELECTRONIC SCALE

FIELD OF THE INVENTION

The present invention relates to a price-calculating electronic scale with an input keyboard comprising a switch pad having a plurality of switch contact elements, each of which opens or closes a current path, and a key pad disposed on top thereof having switch-contact-activating key fields, under each one of which at least one switch contact element is disposed, and with a logic device connected to the input keyboard for recognizing the activation of the individual key fields on the basis of switch signals emitted by the switch contact elements disposed under them, and for the evaluation of each recognized activation of the key fields in correlation to the key field which was recognized as having been activated.

BACKGROUND OF THE INVENTION

In connection with scales of this type, the price per unit of weight, for example the price per kilogram, of the product to be weighed, which has been placed on the scales, is entered on the input keyboard. By entering the price in this way, the logic device calculates automatically the final price of the product weighed. In particular, if the scales are used as self-service scales, the key fields of the keyboard are normally made in the form of symbol keys, where the individual key fields have symbols (pictographs) which clearly indicate to the self-service customer all individual items of the total range of goods provided for self-service. The self-service customer is then in a position to enter in a particularly simple manner the price per unit of weight of the product to be weighed by actuating a single key field.

In connection with known scales of the type mentioned above such as that disclosed in German Utility Model DE-GM 87 00 968, the capability of changing the writing or symbols assigned to the individual key fields in accordance with the actual range of goods available is known. Such changes in the range of goods occur particularly frequently in connection with fruit stands or with special sales in self-service stores. But, because the number and arrangement of the key fields remains unchanged, the predetermined number and size of the key fields corresponds to a pre-set maximum number of individual goods within a range of goods. Therefore, with respect to a range of goods comprising a small number of individual goods, part of the key fields remain unused. However, it would be desirable to have available, instead of the unused portion of the keyboard, a smaller number of larger key fields corresponding to the smaller range of goods. This would particularly improve the legibility of the input keyboard.

SUMMARY OF THE INVENTION

It is an object of the invention to design price-calculating electronic scales of the type mentioned above in such a way that it is possible to adapt in a simple manner the division of an input keyboard into key fields usable with the current data requirements.

This object is attained in accordance with the present invention by providing different key pads for the input keyboard, which can be optionally placed on the switch pad, where the key fields are disposed in differing arrangements and cover different groupings of switch contact elements. The logic device can be set to the particular key pad provided to evaluate the appearance of a switching signal from every switch contact element disposed under a particular key field of the particular key pad provided as an actuation of the particular key field.

By the present invention, it is possible to use differently divided key pads for the input keyboard of one and the same price-calculating electronic scale. The key pad need only be put on the switch pad. It is only required that each key field cover one or a plurality of switch contact elements completely, by means of which the switch contact elements are divided into groupings which are different from each other and each grouping of which is assigned to exactly one key field. In this manner the arrangement of the key pad can be adapted to the particular requirements of the user. If the number of the individual goods to be weighed in the entire range of goods is small, it is possible to select an appropriate number of key fields, which accordingly are comparatively large. However, the total number of key fields increases with an increase of individual goods to be weighed by the scales. Because the same number of available switch contact elements or the same area of the switch pads and the key pads remains, the size of the individual key fields correspondingly decreases. The key fields of an individual key pad may be of different sizes, and any shape of the key field which leads to a distinct arrangement of the switch contact elements into groupings is possible.

The logic device can be set to correspond to the particular key pad provided so that it evaluates the appearance of a switch signal from one or a plurality of switch contact elements of a particular grouping as an activation of exactly the particular key field covering this grouping. The logic device precisely and accurately detects the activation of each key field and thus receives the required information for calculating the final price of the goods to be weighed which have been placed on the scales. In the logic device, a certain price per unit of weight is assigned to each key field and therefore the actuation of a particular key field leads to the selection of the operand which is the basis for the weight calculation for the price per unit, for example the price per kilogram.

In a preferred embodiment, the logic device is programmable. As a result, the assignment between all switch signals of each grouping of switch contact elements covered by a particular key field and the corresponding key field is determined for each one of the key pads. Consequently, adjustment of the logical device to the particular key pad provided can be performed simply and flexibly. As soon as the desired arrangement of the key pad into key fields has been made, it is only necessary to set the assignment between each grouping of switch contact elements and the key field covering that grouping by programming the programmable logic device. This results in a particularly simple design, because no switching between appropriately adapted logic components needs to be made in the logic device for the various key pads. Also, the programming of the logic device does not require complex demands, so that it can be performed by each user.

In accordance with a further feature of the present invention it is also provided that a discrete identification code is assigned to each one of the key pads, which can be input into the logic device. By input of this identification code, the logic device can be independently set to the appropriate key pad. Thus, the setting of the logic device to the different key pads is automated. In this way the identification code assigned to each key pad results in an appropriate switching or re-programming of the logic device by adaptation to the key pad then selected. The amount of work to change the key pad is reduced to merely entering the respective identification code.

In this regard, a further feature of the present invention consists in that the logic device comprises a scanning device for automatic input of the identification code. The identification code is provided in a form that can be scanned. Therefore, when the key pad is changed, the user need not enter the identification code himself, for example by means of an input keyboard, since this is done automatically by the scanning device.

While it is desirable to be able to remove the key pad from the switch pad of the input keyboard, the precise alignment between the key fields and the groupings of switch contact elements assigned to them must be maintained. It is therefore an object of the present invention to secure the key pad placed on the switch pad by providing retaining elements to prevent displacement in the plane of the switch pad.

In yet another embodiment of the input keyboard, it is also an object to dispose a knobbed foil between the key pad and the switch pad, with thicker knobs in the spaces coinciding with the switch contact elements. This provides for precise operation, because the thicker knobs precisely transfer the pressure emanating from the key fields placed atop them to the switch contact elements and insure that the latter respond well to actuation of the corresponding key field.

Demarcation of the key fields on the key pad can be provided in any form suitable for identifying the key fields. A preferred possibility is to print the key fields on the key pads. Alternately it may also be provided for the surface of the key fields to be at a different height with respect to the plane of the key pad. While in the first mentioned case the surface of the key fields is flush with the plane of the key pads, the key pads are raised above the plane of the key pads in the latter case. This can be done, for example, by embossing the key pad.

Various possibilities are also conceivable for printing the key fields, such as symbols, pictographs or other indicia. One method is to make the key pad transparent in the area of the key fields and to place a foil with writing behind it. However, alternatively, the key pad may contain writing in the area of the key fields. In both cases the foil or the key fields containing the writing can be imprinted with the desired information or may be in a form so that the user himself can write on them with a suitable writing instrument. Embossing of the key fields, either alone or in connection with coloring, is also possible, for example, in order to apply the desired designations.

Further objects and advantages of the present invention will become more apparent from the following description taken in conjunction with the accompanying drawings.

DETAILED DESCRIPTION OF THE PREFERRED EMBODIMENTS

Figure 1:
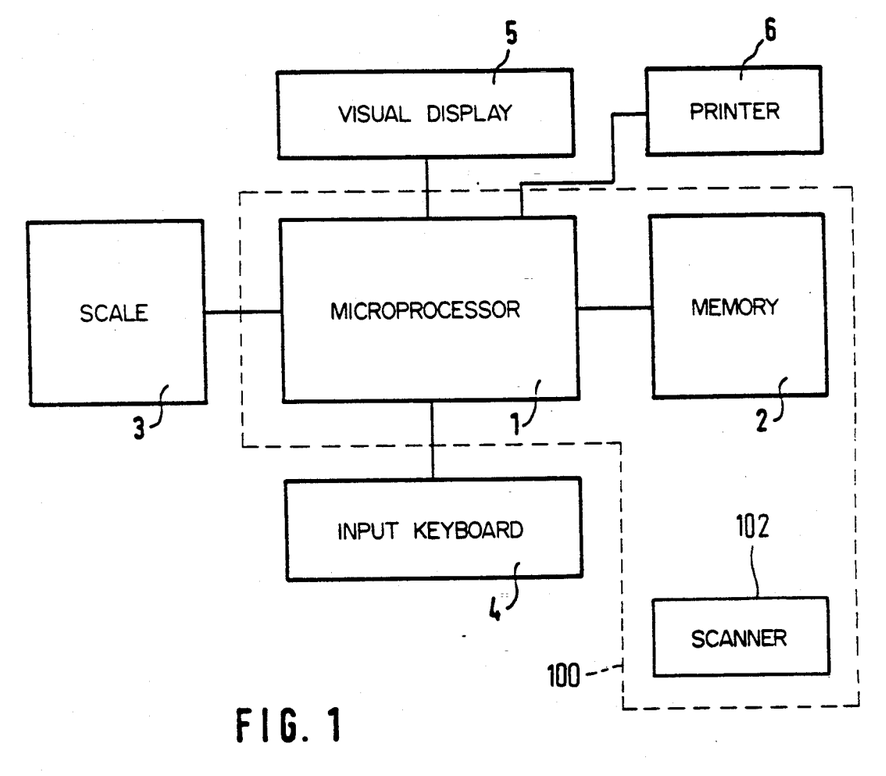
FIG. 1 is a schematic block diagram of a price-calculating electronic scale according to the present invention.

The price-calculating electronic scale according to the present invention is illustrated in schematic block diagram form in FIG. 1. The scale comprises a logic device 100 formed by a microprocessor 1 with a memory 2 connected thereto. A scale 3 is connected as input to the microprocessor 2 for entering the weight value of an object to be weighed, which has been placed on the weighing component. An input keyboard 4 is provided for entering a price per unit of weight, for example a price per kilogram. In the exemplary embodiment shown, a visual display 5 is provided for displaying the price of the object to be weighed, calculated by the microprocessor 1. In addition, a printer 6 is provided for printing a price label under the control of the microprocessor 1. The memory 2 contains in particular the operating program for the microprocessor 1.

Figure 2A:
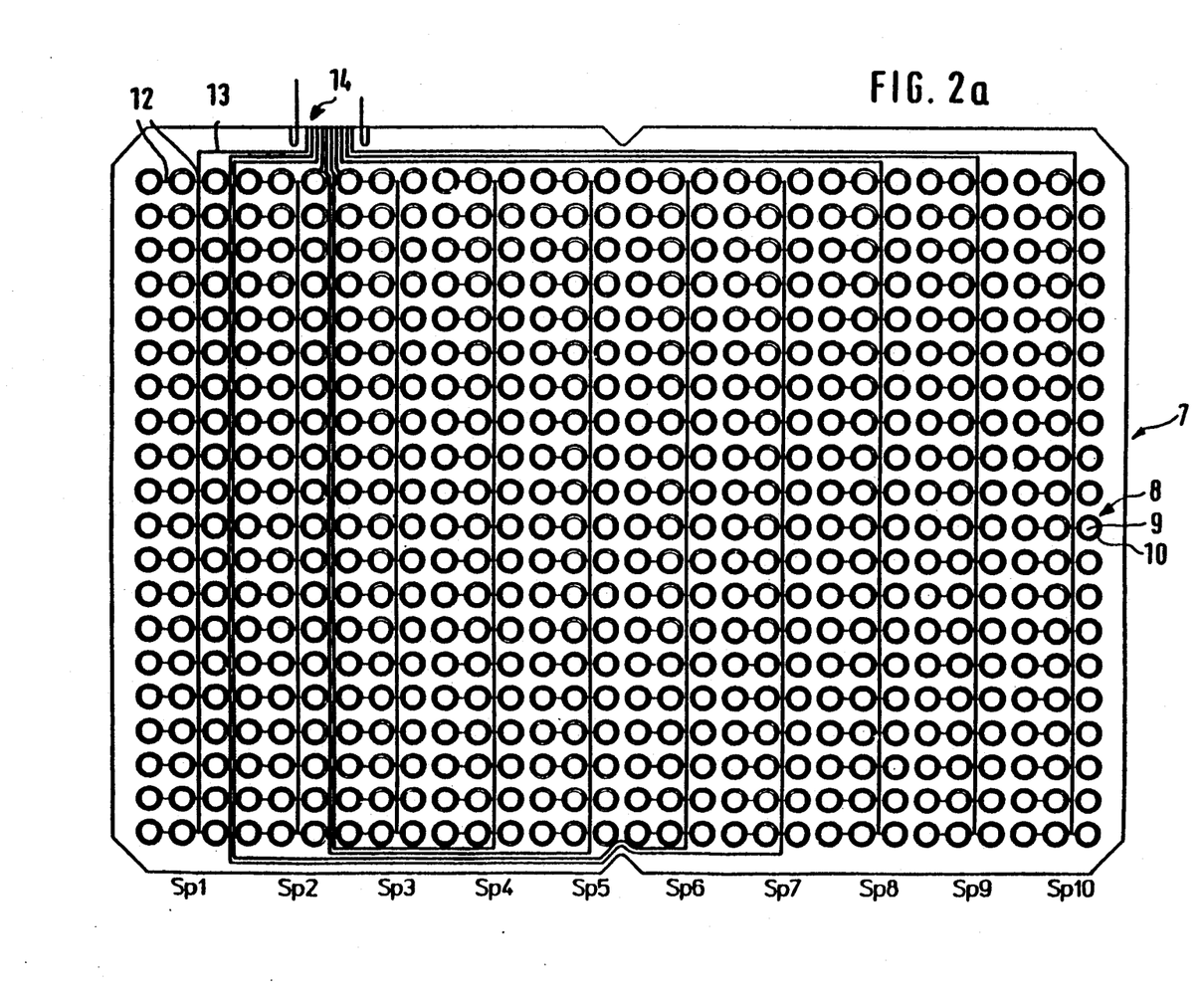
FIGS. 2a and 2b are views from above and below, respectfully, of a switch pad of an input keyboard provided for the electronic scale shown in FIG. 1.
Figure 2B:
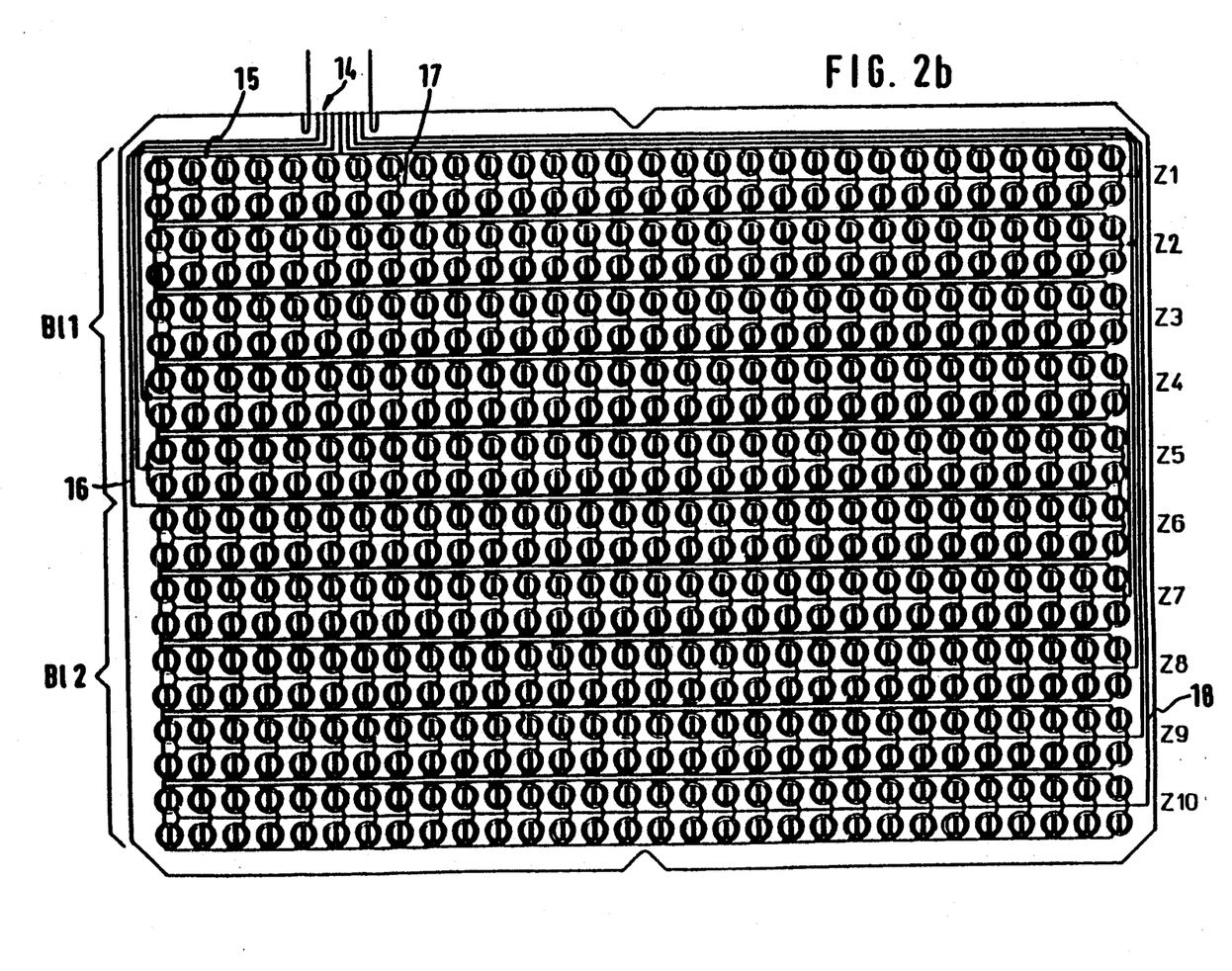

Referring to FIGS. 2a and 2b, the input keyboard 4 has a switch pad 7 including switch contact elements 8 which are disposed evenly in a rectangular pattern. In the exemplary embodiment shown, the pattern contains thirty switch contact elements 8 along the direction of the long side of the rectangle and altogether twenty in the direction of the short side of the rectangle. In accordance with the view of FIG. 2a, which shows the switch pad 7 from above in relation to the input keyboard 4, each switch contact element 8 has, in particular, a top contact surface 9, which is disposed above a bore 10 formed in the switch pad 7. As shown in the bottom view of FIG. 2b, each one of the top contact surfaces 9 of the switch contact elements 8 is opposed by a bottom contact surface comprising left and right halves 11a and 11b, respectively, on the underside of the switch pad 7.

As further shown in FIG. 2a, groups of three (triads) top contact surfaces 9 are connected with each other by strip conductor sections 12. The rows of these triads of upper contact surfaces 9 formed in this way extend in the direction of the short side of the rectangle and are each connected with a lead 14 at the edge of the switch pad 7 by a strip conductor 13. Thus the top contact surfaces 9 are combined into ten columns Sp1 to Sp10, each with twenty triads of top contact surfaces 9, and are connected out of each column to a lead 14 by a strip conductor 13.

As shown in FIG. 2b, the bottom contact surfaces are first divided into two blocks B11 and B12 divided down the middle of the switch pad 7. The left halves 11a in block B11 of the bottom contact surfaces are connected with the strip conductor 15 to the lead 14, while the strip conductor 16 is connected with all left halves 11a in block B12. The rows of right halves 11b of the bottom contact surfaces, extending along the long side of the rectangle are connected by strip conductor sections 17 in such a way, that two rows of right halves 11b which immediately adjoin each other are connected. Thus, the bottom contact surfaces are connected in ten lines Z1 to Z10 of sixty right halves 11b each. Further-more, the lines Z1 and Z10 are connected with each other by a common strip conductor 18 and are connected with the lead 14. This is the same for the pairs of lines Z2 and Z9, Z3 and Z8, Z4 and Z7 and Z5 and Z6. Thus, these pairs of lines also have a common strip conductor 18 for connection to the lead 14. In spite of this paired connection of the lines, they can be individually identified, because the lines of each pair are associated with different blocks B11 or B12 and can be differentiated by the strip conductors 15 or 16 which identify the blocks.

Figure 3A:
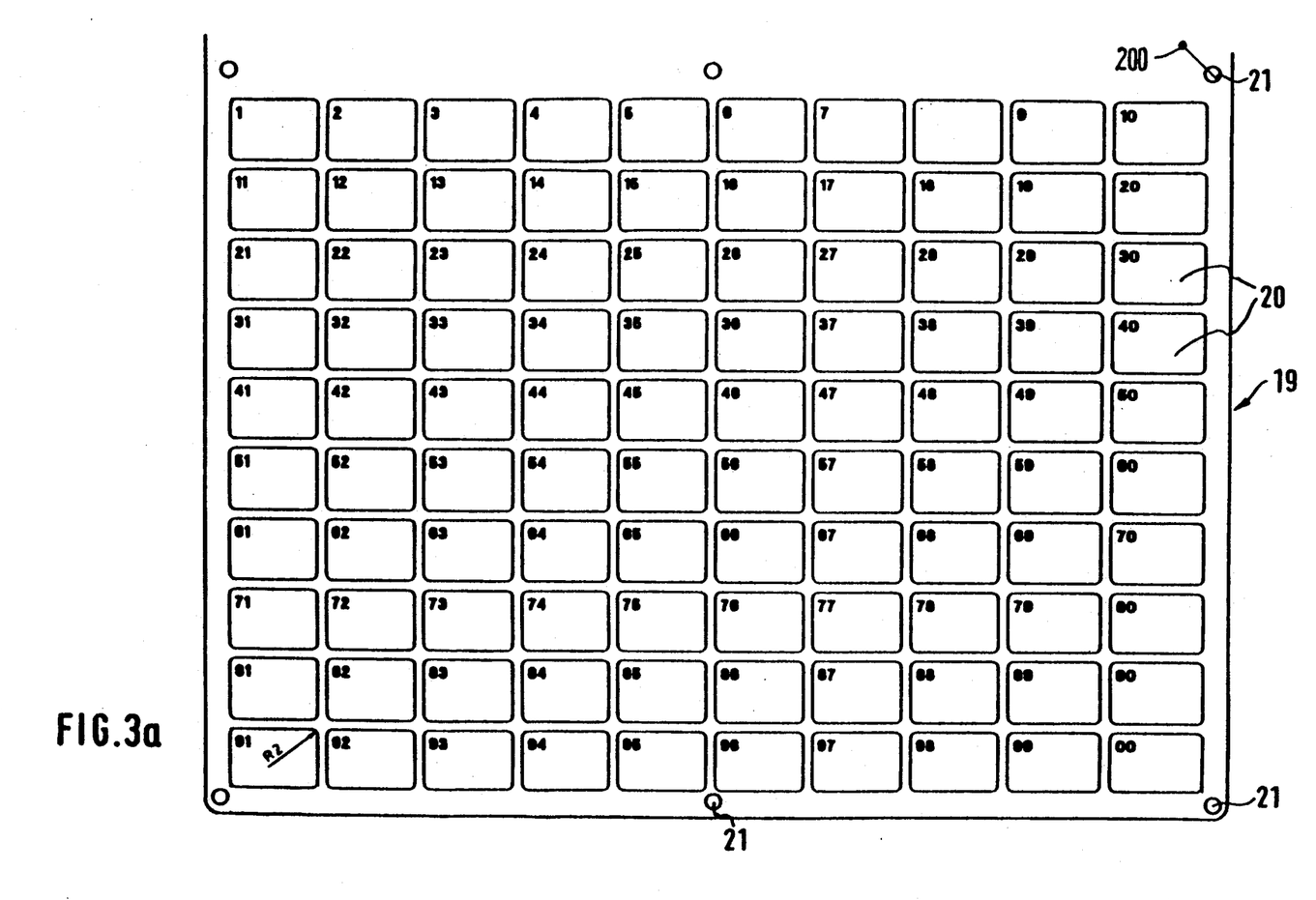
FIG. 3a is a top view of a key pad with evenly distributed key fields for use in the input keyboard shown in FIG. 2.

It is apparent from the above description that the smallest grouping of separately addressable switch contact elements 8 consists of a total of six switch contact elements 8, arranged so that three switch contact elements 8 extend along the long side of the rectangle and two extend along the short side of the rectangle. Accordingly, a key pad 19, shown in FIG. 3a, is evenly divided into key fields 20, which are arranged and formed in a rectangular pattern in such a way, that each key field 20 exactly covers each one of these smallest groupings of six switch contact elements 8 when the key pad 19 has been placed on the switch pad 7. Thus the key pad 19 has a pattern of 10×10 rectangular key fields 20. These are numbered 1 to 99 and 00 in FIG. 3a.

To assure coincidence between the key fields 20 and the groupings of switch contact elements 8 located under them, the key pad 1 has been provided along its edges with positioning holes 21, through which positioning pins 200 extend when the key pad 19 is placed on the switch pad 7 disposed in the input keyboard 4. In this way the positioning pins are used as retaining elements which prevent displacement of the key pad 19 in the plane of the switch pad 7.

The key fields 20 may be printed on the key pad 19. Alternatively or additionally, however, the key fields may be embossed so that they extend above or below the plane of the key pad 19. The key pad 19 may be made transparent in a surface portion thereof, at least in the area of the key fields 20, so that a foil which bears printed indicia corresponding to the key fields can be placed behind it which shows the desired designation of each key field 20 and can be seen through the transparent key field 20. Alternatively, the key fields 20 themselves can contain printing, each key field being provided with the desired designation by printing or writing on the key pad 19. The desired designation can also be applied by embossing the key field 20.

When the key pad 19 is placed on the switch pad 17 in the manner described above, pressure exerted on any one of the key fields 20 is transmitted (through the foil with the writing, if provided), to one or a plurality of switch contact elements 8 located under the key field 20. In this way the top contact surface 9 comes into contact, through the bore 10, with the halves 11a, 11b of the bottom contact surface and provides a switch signal to the microprocessor 1 connected with the input keyboard 4. Because the microprocessor 1 can, as described above, accurately identify each one of the groupings of six switch contact elements 8 because of the arrangement in columns and lines as well as the division into blocks of the switch contact elements 8, the activation of each key field 20 corresponds to a precisely defined piece of information for the microprocessor 1. Therefore, the microprocessor 1, through the use of an operating program stored in the memory 2, can assign a pre-programmed price per unit of weight to each defined key field 20. If an object to be weighed is placed on the scale 3 and the user activates the key field 20 assigned to this object and recognizable by the appropriate writing or symbol for the object to be weighed, the price per unit of weight on which the calculation of the price is based is available by means of the operating program of the microprocessor 1. Because of the weight value provided by the scale 3, all operands for the weight calculation taking place in the microprocessor are defined.

Because each one of the groupings composed of 3×2 switch contact elements 8 described in the above exemplary embodiment provides one switch signal, the key field shown in FIG. 3a and representing one key field 20 for each one of these groupings constitutes the smallest division possible of the key pad 19 into key fields 20. In the exemplary embodiment shown, there is a total of one hundred key fields 20. Therefore, it is possible to enter a total of one hundred different prices per unit of weight for one hundred different single items of a range of goods. The range of goods is defined to be the entire range of key fields 20. With a lesser number of individual goods contained in a certain range of goods, however, it would be desirable to also use the entire available keyboard space and to provide for this purpose a smaller number of correspondingly enlarged key fields.

Figure 3B:
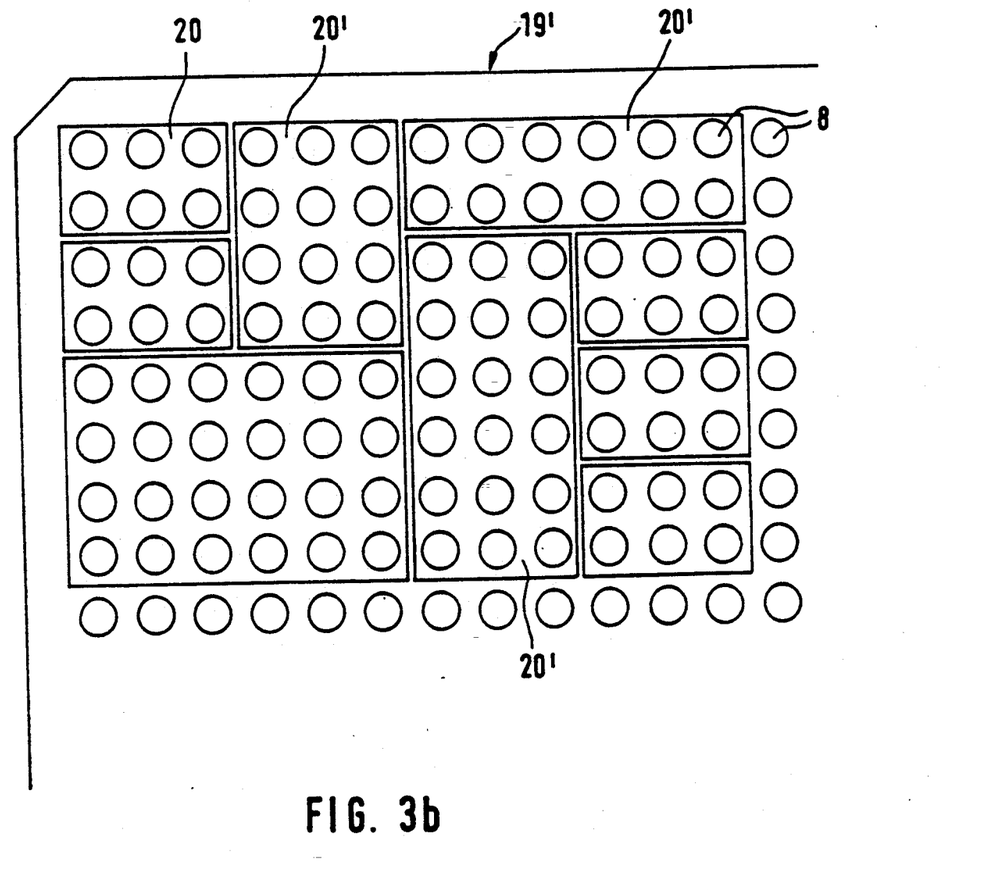
FIG. 3b is a top view of a key pad with irregularly distributed key fields for use in the input keyboard shown in FIG. 2.

In this regard, rather than the key pad 19 shown in FIG. 3a, the key pad 19' is provided for this purpose, which is shown by way of example in FIG. 3b. The key pad 19' has key fields 20 which, as in the case of the key pad 19 shown in FIG. 3a, cover the minimal grouping of 3×2 switch contact elements 8, as well as enlarged key fields 20' covering enlarged groupings of switch contact elements 8 of two or more of the minimal (3×2) groupings. If an enlarged key field 20' is activated, a switch signal can be generated by each one of these minimal groupings because of the possible response of two or more of the minimal groupings. It has therefore been provided that, by using the key pad 19', the microprocessor 1 and the memory 2 (embodying the logic device 10) are adjusted to the newly provided key pad 19' in such a way that it evaluates the appearance of the different switch signals of an enlarged grouping covered by an enlarged key field 20' as an activation of precisely that key field 20'. This adjustment is made by making an appropriate change in the operating program stored in the memory 2.

Re-programming of the logic device 100 is easily performed by individually entering the program changes required by a change from one key pad to another via the input keyboard 4. However, this can be done faster and simpler by assigning a discrete identification code to each key pad 19, 19'. This identification code is entered into the logic device 10 when the key pads are changed, and in this case the logic device 100 has been designed in such a way that it automatically performs the required adjustment or re-programming on the basis of the entered identification codes, for example by means of a corresponding recognition program.

In order to also automate the entering of the identification codes when changing the key pads, the identification codes are disposed on the appropriate key pad 19, 19' in a form which can be scanned. The logic device 100 is provided with an electronic scanning device 102 which automatically reads in the identification code.

Figure 4:
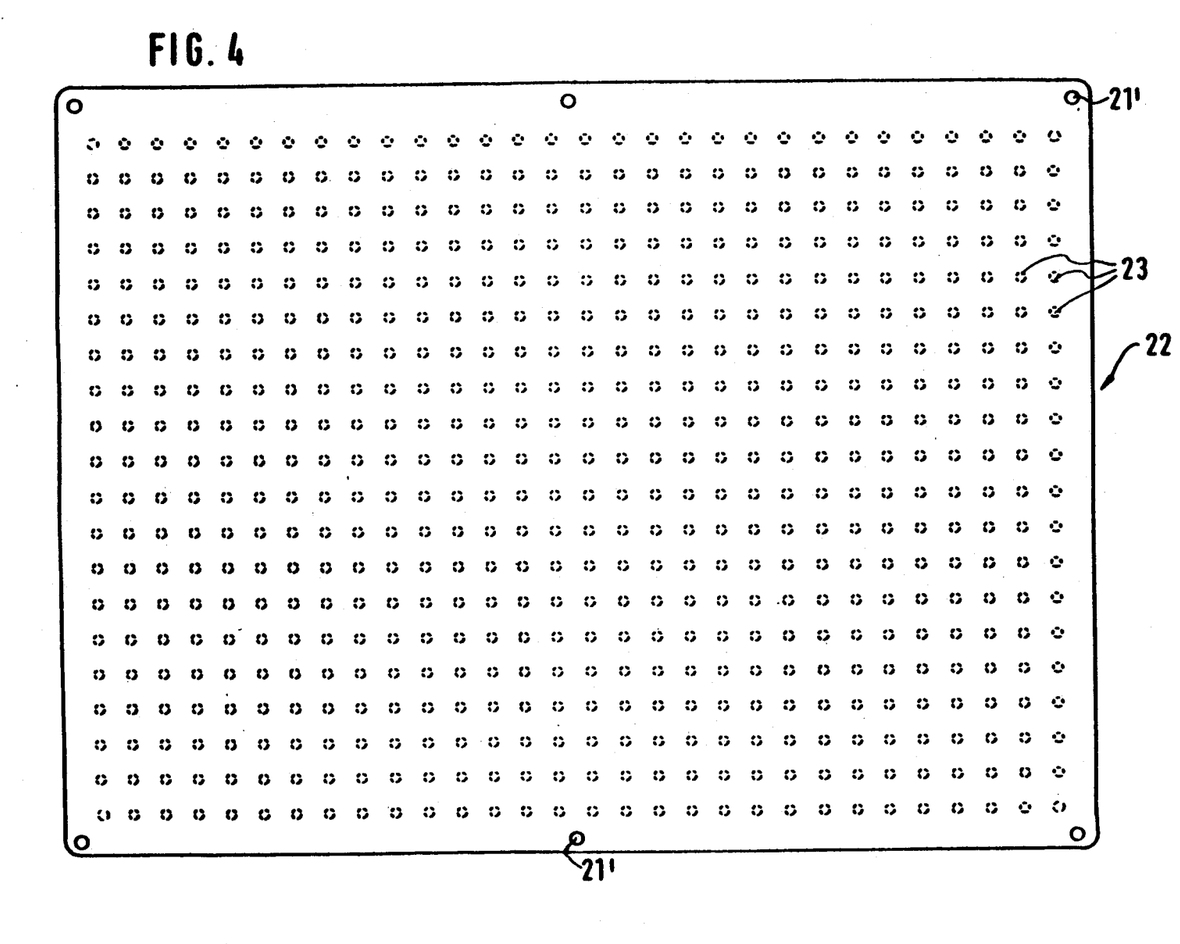
FIG. 4 is an illustration of a knobbed foil used with the input keyboard shown in FIG. 2.

In the exemplary embodiment described above, the key pad 19, 19' is loosely placed on the switch pad 7, if desired with the interposition of a thin foil containing writing, and is secured against lateral displacement with the aid of the positioning holes 21. It is also possible to place a knobbed foil 22 (shown in FIG. 4) between the switch pad 7 and the key pad 19, 19' as well as the foil with writing, which by means of positioning holes 21', which are coincident with the positioning holes 21 of the key pad 19, 19', is also secured against lateral displacement in respect to the switch pad 7. The knobbed foil 22 has, coincident with the switch contact elements 8 of the switch pad 7, thicker knobs 23 extending out of the plane of the foil. Therefore, the activating pressure put on the key pads 20, 20' is transmitted specifically to the switch contact elements 8. However, the knobbed foil 22 may have conducting thicker knobs 23 and may cooperate with a switch pad in the form of a strip conductor for providing the switch signals.

The individual foils placed on top of each other can be removed at any time without the use of tools and the exchange of individual foils as well as their temporary removal for cleaning purposes is easily possible at any time.

The foregoing description is made by way of example only and is not intended to limit the present invention in any way except as set forth in the following claims.

What is claimed is:

1. A price-calculating electronic scale with an input keyboard, said input keyboard comprising:
   a switch pad having a plurality of switch contact elements, each of which opens or closes a current path to generate a switch signal representative thereof;
   a key pad disposed on top of said switch pad and having a plurality of switch contact activating key fields, each switch contact activity field being positioned above at least one switch contact element; and
   a logic device connected to the input keyboard for recognizing the activation of the individual key fields on the basis of said switch signals emitted by the corresponding switch contact elements disposed under the individual activating key fields;
   the activating key fields of said key pad being disposed in predetermined patterns to cover particular groupings of the switch contact elements of said switch pad, the logic device being preset to process switch signals generated via said key pad by evaluating the switch signal from every switch contact element disposed under a particular activating key field.

2. A price-calculating electronic scale in accordance with claim 1, wherein the logic device is programmable for programming the assignment between all switch signals of each particular grouping of switch contact elements covered by a particular key field.

3. A price-calculating electronic scale in accordance with claim 1, and further comprising a discrete identification code assigned to the key pad and which is input into the logic device to permit the logic device to process switch signals generated via said key pad.

4. A price-calculating electronic scale in accordance with claim 3, wherein the logic device comprises a scanning device and the identification code is provided in a form which can be scanned by said scanning device to input the identification code into the logic device.

5. A price-calculating electronic scale in accordance with claim 1, and further comprising retaining elements for preventing displacement of the key pad relative to the switch pad in the plane of the switch pad.

6. A price-calculating electronic scale in accordance with claim 1, and further comprising a knobbed foil disposed between the key pad and the switch pad and including knobs extending from the plane of the foil positions coinciding with the position of the switch contact elements.

7. A price-calculating electronic scale in accordance with claim 1, wherein the activating key fields are printed on the key pad.

8. A price-calculating electronic scale in accordance with claims 1, wherein a surface of the activating key fields has a height difference with respect to the plane of the key pad.

9. A price-calculating electronic scale in accordance with claim 1, and further comprising foil with printed indicia illustrating the key fields, and wherein a surface of the key pad is transparent in the area of the key fields so that the printed foil is placed behind the surface of the key pad.

10. A price-calculating electronic scale in accordance with claim 1, wherein the key pad contains printed indicia in the area of the activating key fields for designating the key fields.

11. In a price-calculating electronic scale with an input keyboard comprising:
    a switch pad having a plurality of switch contact elements, each of which opens or closes a current path to generate a switch signal representative thereof;
    a key pad disposed on top of said switch pad and having a plurality of switch contact activating key fields, each switch activating key fields being positioned above at least one switch contact element; and
    a logic device connected to the input keyboard for recognizing the activation of the individual key fields on the basis of said switch signals generated by the corresponding contact elements disposed under the individual activating key fields;
    said input keyboard being capable of receiving one of a plurality of key pads, the activating key fields of a particular key pad being disposed in a predetermined pattern to cover particular groupings of switch contact elements of said switch pad, the logic device being preset to process switch signals generated via said particular key pad by evaluating the switch signal from every switch contact element disposed under a particular activating key field.

12. A price-calculating electronic scale in accordance with claim 11, wherein the logic device is programmable for programming the assignment between all switch signals of each particular grouping of switch contact elements covered by a particular key field.

13. A price-calculating electronic scale in accordance with claim 11, and further comprising a discrete identification code assigned to the key pad and which is input into the logic device to permit the logic device to process switch signals generated via said key pad.

14. A price-calculating electronic scale in accordance with claim 13, wherein the logic device comprises a scanning device and automatic input of the identification code is provided in a form which can be scanned by said scanning device to input the identification code into the logic device.

15. A price-calculating electronic scale in accordance with claim 11, and further comprising retaining elements for preventing displacement of the key pad relative to the switch pad in the plane of the switch pad.

16. A price-calculating electronic scale in accordance with claim 11, and further comprising a knobbed foil disposed between the key pad and the switch pad and including knobs extending from the plane of the foil positions coinciding with the position of the switch contact elements.

17. A price-calculating electronic scale in accordance with claim 11, wherein the activating key fields are printed on the key pad.

18. A price-calculating electronic scale in accordance with claims 11, wherein a surface of the activating key fields has a height difference with respect to the plane of the key pad.

19. A price-calculating electronic scale in accordance with claim 11, and further comprising foil with printed indicia illustrating the key fields, and wherein a surface of the key pad is transparent in the area of the key fields so that the printed foil is placed behind the surface.

20. A price-calculating electronic scale in accordance with claim 11, wherein the key pad contains printed indicia in the area of the activating key fields for designating the key fields.

21. A electronic price-calculating scale comprising:
a scale for determining the weight of an object and providing a weight signal representative thereof;
an input keyboard for entering the price per weight of a particular object to be weighed and priced, said input keyboard comprising:
a switch pad having a plurality of switch contact elements, each of which opens or closes a current path to generate a switch signal representative thereof;
a key pad disposed on top of said switch pad and having a plurality of switch contact activating key fields, each switch activating key fields being positioned above at least one switch contact element;
logic means connected to the input keyboard and the scale for recognizing the activation of the individual key fields on the basis of said switch signals generated by the corresponding contact elements disposed under the individual activating key fields for generating a price of an object on the scale based on the weight signal and the price per weight of the object as input by the input keyboard;
said input keyboard being capable of receiving one of a plurality of key pads, the activating key fields of a particular key pad being disposed in a predetermined pattern to cover particular groupings of switch contact elements of said switch pad, the logic means being preset to process switch signals generated via each of said key pads by evaluating the switch signal from every switch contact element disposed under a particular activating key field.

22. The electronic price-calculating scale of claim 21, wherein the logic means is programmable for programming the assignment between all switch signals of each particular grouping of switch contact elements covered by a particular key field.

23. The electronic price-calculating scale of claim 21, and further comprising a discrete identification code assigned to each key pad, the identification code being input into the logic means to permit the logic means to process the switch signals generated via each key pad.

24. The electronic price-calculating scale of claim 23, and further comprising a scanning means, and wherein the identification code is provided in a form which can be scanned by said scanning means to input the identification code into said logic means.

* * * * *